US007951258B2

(12) United States Patent
Karlsson et al.

(10) Patent No.: US 7,951,258 B2
(45) Date of Patent: May 31, 2011

(54) ARRANGEMENT AND METHODS FOR THE MANUFACTURE OF COMPOSITE LAYER STRUCTURES

(75) Inventors: Jerry Karlsson, Trollhättan (SE); Heinrich Planck, Nürtingen (DE); Thomas Stegmaier, Owen (DE); Hermann Finckh, Wolfschlugen (DE)

(73) Assignee: Lamera AB, Gothenburg (SE)

(*) Notice: Subject to any disclaimer, the term of this patent is extended or adjusted under 35 U.S.C. 154(b) by 121 days.

(21) Appl. No.: 10/711,645

(22) Filed: Sep. 29, 2004

(65) Prior Publication Data

US 2005/0126676 A1 Jun. 16, 2005

Related U.S. Application Data

(63) Continuation of application No. PCT/EP03/03303, filed on Mar. 29, 2003, now abandoned.

(30) Foreign Application Priority Data

Mar. 29, 2002 (DE) .................................. 102 14 010

(51) Int. Cl.

| | |
|---|---|
| ***B32B 7/14*** | (2006.01) |
| ***B32B 37/02*** | (2006.01) |
| ***B32B 37/06*** | (2006.01) |
| ***B32B 37/14*** | (2006.01) |
| ***B44C 1/165*** | (2006.01) |
| ***B44C 1/24*** | (2006.01) |
| ***B29C 65/48*** | (2006.01) |
| ***B29C 65/52*** | (2006.01) |
| ***B29C 65/62*** | (2006.01) |
| *B44C 1/175* | (2006.01) |
| *B32B 38/14* | (2006.01) |
| *B32B 37/04* | (2006.01) |
| *B32B 37/12* | (2006.01) |

(52) U.S. Cl. ..................... 156/291; 156/241; 156/275.3; 156/275.5; 156/276; 428/86; 428/373; 428/374

(58) Field of Classification Search .......... 156/230–249, 156/309.9, 276, 73.5, 130.3, 166–181, 421, 156/275.3, 275.7, 291, 295, 275.5; 428/86, 428/180–206, 373–374; 442/388

See application file for complete search history.

(56) References Cited

U.S. PATENT DOCUMENTS

| | | | | |
|---|---|---|---|---|
| 3,327,708 | A * | 6/1967 | Sokolowski | 602/45 |
| 3,616,007 | A * | 10/1971 | Anderson | 156/190 |
| 3,616,126 | A * | 10/1971 | Tungseth | 428/86 |
| 3,684,637 | A | 8/1972 | Andersson et al. | |

(Continued)

FOREIGN PATENT DOCUMENTS

CA 2173894 10/1996

(Continued)

*Primary Examiner* — Sonya Mazumdar

(74) *Attorney, Agent, or Firm* — Novak Druce + Quigg LLP

(57) ABSTRACT

Method and arrangement for manufacturing core composite layer workpieces (sandwich structures) from at least one first and at least one second cover sheet (1, 2) between which a core sheet (30) including especially short cut fibers (9) is provided, are disclosed with which a continuous and substantially break free manufacture can be conducted which leads to composite layer structures with reasonable costs. Single manufacturing parameters can specifically be varied with different embodiments so that in a relatively simple manner composite layer structures with desired physical properties can be obtained, for example with respect to their strength, stiffness, flexibility, mechanical and acoustic absorption capabilities, working properties, and so on. Composite layer structures for new applications can be manufactured as well.

29 Claims, 3 Drawing Sheets

5 2 9 91 9 5 1

U.S. PATENT DOCUMENTS

| | | | | | |
|---|---|---|---|---|---|
| 3,706,614 | A | * | 12/1972 | Kirkpatrick et al. | 156/151 |
| 3,764,067 | A | * | 10/1973 | Coffey et al. | 239/1 |
| 3,767,055 | A | * | 10/1973 | Flatland | 210/242.1 |
| 3,767,505 | A | * | 10/1973 | Coran et al. | 156/276 |
| 3,850,659 | A | * | 11/1974 | Barnes | 427/464 |
| 3,958,055 | A | * | 5/1976 | Hadley et al. | 428/198 |
| 3,975,222 | A | * | 8/1976 | Mesek | 156/62.2 |
| 4,034,134 | A | | 7/1977 | Gregorian et al. | |
| 4,035,532 | A | * | 7/1977 | Gregorian et al. | 428/90 |
| 4,142,929 | A | * | 3/1979 | Otomine et al. | 156/72 |
| 4,235,946 | A | * | 11/1980 | Lauchenauer | 427/185 |
| 4,687,527 | A | * | 8/1987 | Higashiguchi | 156/72 |
| 5,030,488 | A | | 7/1991 | Sobolev | |
| 5,185,198 | A | * | 2/1993 | Lefeber et al. | 428/301.1 |
| 5,651,850 | A | * | 7/1997 | Turner et al. | 156/171 |
| 5,858,156 | A | * | 1/1999 | Abrams et al. | 156/230 |
| 5,858,556 | A | * | 1/1999 | Eckert et al. | 428/586 |
| 5,866,272 | A | * | 2/1999 | Westre et al. | 428/593 |
| 6,534,144 | B1 | * | 3/2003 | Bando et al. | 428/74 |
| 6,821,601 | B2 | * | 11/2004 | Tsiarkezos et al. | 428/102 |
| 7,381,284 | B2 | * | 6/2008 | Abrams | 156/155 |
| 2002/0123287 | A1 | * | 9/2002 | Davies et al. | 442/327 |
| 2003/0183332 | A1 | * | 10/2003 | Simila | 156/291 |
| 2007/0062639 | A1 | * | 3/2007 | Chang et al. | 156/291 |

FOREIGN PATENT DOCUMENTS

| | | | |
|---|---|---|---|
| DE | 3621599 | A1 | 1/1987 |
| DE | 3844842 | A1 | 10/1989 |
| DE | 4131394 | A1 | 4/1993 |
| EP | 0014973 | A1 | 9/1980 |
| EP | 033685 | A2 | 9/1989 |
| EP | 1059160 | A2 | 12/2000 |
| WO | WO 9801295 | A1 | 1/1998 |

* cited by examiner

ARRANGEMENT AND METHODS FOR THE MANUFACTURE OF COMPOSITE LAYER STRUCTURES

CROSS-REFERENCE TO RELATED APPLICATIONS

The present application is a continuation patent application of International Application No. PCT/EP03/003303 filed 29 Mar. 2003 which claims priority to DE Application No. 10214010.3 filed 29 Mar. 2002. Said applications are expressly incorporated herein by reference in their entireties.

TECHNICAL FIELD

The invention relates to arrangements and methods for the manufacture of (core-) composite layer workpieces or composite layer structures (sandwich-structures) from at least one first and at least one second cover sheet between which a core sheet is provided which comprises a composition of fibers, especially short cut fibers (flock fibers, flock material) and an adhesive.

The cover sheets and the fibers each can be made of steel, aluminum or any other metallic materials, and including alloys. The cover sheets can also be made of non-metallic materials like synthetic materials (for example nylon), ceramics, textiles, paperboard or any substances or mixtures comprising these materials wherein neither the cover sheets nor the fibers must be made from the same material. Depending on the purpose of application, almost any combination of materials can be chosen.

BACKGROUND OF INVENTION

Exemplary materials for the cover sheets and the core sheet are disclosed in the EP1059160 which shall be made by reference to a part of this disclosure.

With these composite layer workpieces numerous advantages can be achieved in comparison to solid workpieces having the same dimensions. Very high mechanical and acoustic energy absorption can be obtained, wherein the structures furthermore can be provided with an insensitive and corrosion resistant surface depending on the type, shape, density, thickness, length and orientation of the fibers, for example a particularly low weight and a high flexural strength or a superior moldability and flexibility, respectively. All these properties can be optimized according to the proposed machining (like bending, deep-drawing, welding, cutting, etc.), as well as according to the application of the composite layer workpieces.

WO 98/01295 discloses a formable sandwich construction material which comprises at least two plates of metallic fibers. By this, a substantially higher temperature resistance shall be obtained in comparison to those structures which comprise fibers of organic materials. The manufacture, which is disclosed in the EP0333685, is conducted such that the plates are covered with an adhesive and then the metallic fibers are deposited onto at least one of the adhesive layers by acceleration by means of an electrostatic field (electrostatic flocking process) so that there are substantially perpendicularly fixed relative to the plate. Then the plates are pressed onto each other and the adhesive is hardened.

Furthermore, DE4131394 discloses a sound insulation material which is formed by two outer sheets between which a core sheet containing a filling material and a binder is provided wherein the three sheets are continuously pressed against each other during the manufacture of the sound insulation material.

DE3621599 discloses a method and a device for distributing short fiber materials onto a horizontally moved sheet-breadth wherein a funnel with a chamber is provided which has a dispensing opening for delivering fiber material through a screen sieve onto the moving sheet and wherein the screen sieve is laterally oscillating. By this, a uniform distribution of the fiber materials over the whole width of the breadth shall be obtained.

Furthermore, EP0014973 discloses a method for the manufacture of a machined part. According to this method, a foil-breadth is coated with a liquid adhesive in a first station and in a second station flock fibers are applied onto the adhesive coating by means of an electrostatic field. Afterwards the adhesive is pre-hardened by means of a heating device so that the flock fibers adhere to the adhesive in the form of a coating and the foil breadth can be pressed and pre-formed together with a supporting part.

Finally, DE3824842 discloses a heat insulating plate and a method for its manufacture in which during a continuous process an inner coating comprising lamella of a heat insulating filling material, mixed with a binder, is fed in between two shaped metal sheets and in which these three sheets are glued together by means of an adhesive which is injected in between these sheets to achieve a sandwich structure.

All these methods and a arrangements, however, have the disadvantage that either they are provided only for the manufacture of specific elements and consequently are not generally applicable, or they are not suited for a continuous production process with which a high output of pieces of sandwich structures per time unit can be manufactured.

SUMMARY OF INVENTION

It is an object of the invention to provide an arrangement with which composite layer workpieces and composite layer or laminate structures of the above mentioned kind can be manufactured with almost any shape at reasonable costs and with a high-quality in a continuously running production process.

It is another object of the invention to provide a method, especially for applying such an arrangement, with which composite layer workpieces and composite layer laminate structures of the above mentioned kind can be manufactured at reasonable costs and with a high quality in a continuously running production process.

These objects are solved according to the invention with an arrangement according to claim 1 or claim 2 and a method according to claim 11, respectively.

A particular advantage of the solutions according to the invention is the fact that by the arrangement and the method, respectively, composite layer workpieces and composite layer structures can be manufactured with different properties and dimensions without having to change the arrangement or the method substantially. The manufactured composite layer workpieces and composite layer structures can be used as a starting material for the manufacture of almost any objects, so that a high flexibility and considerable cost advantages in comparison to the application of arrangements and methods according to the prior art can be obtained.

Furthermore composite layer workpieces and composite layer structures with new properties and for new applications can be manufactured with an arrangement according to the invention and a method according to the invention.

Such applications especially relate to the field of the vehicle technology and construction (cars and motorcycles), airplane and shipbuilding as well for protection purposes (for example armoring or encapsulating machines with fast rotating pans). Such applications also relate to the fields of manufacture of housings, boxes, containers, wrappings and even furniture wherein the composite layer workpieces and composite layer structures can be plain or arched, for example in the form of three-dimensional form elements.

The subclaims disclose advantageous embodiments of single components of the arrangement and of single method steps, respectively, by which a specific variation of single manufacturing parameters can be obtained so that in a relatively simple manner composite layer workpieces and composite layer structures with desired physical properties with respect to their weight, their flexural strengths, their moldability and flexibility, respectively, their mechanical and acoustic energy absorption, their electric and thermal conductivity, etc., as well as with respect to their processability.

BRIEF DESCRIPTION OF THE DRAWINGS

Further details, features and advantages of the invention result from the following description of preferred and exemplary embodiments in connection with the drawings which schematically show.

DETAILED DESCRIPTION

The arrangement according to the invention shall be described in the following with reference to an embodiment for the continuous manufacture of composite layer (laminated or sandwich) panels from two cover sheets in the form of metal foils between which a core sheet with flock fibers is inserted. If instead of one or both metal foils one or more such composite layer panels are used, a multiple composite layer structure can be manufactured as well.

Figure 1:
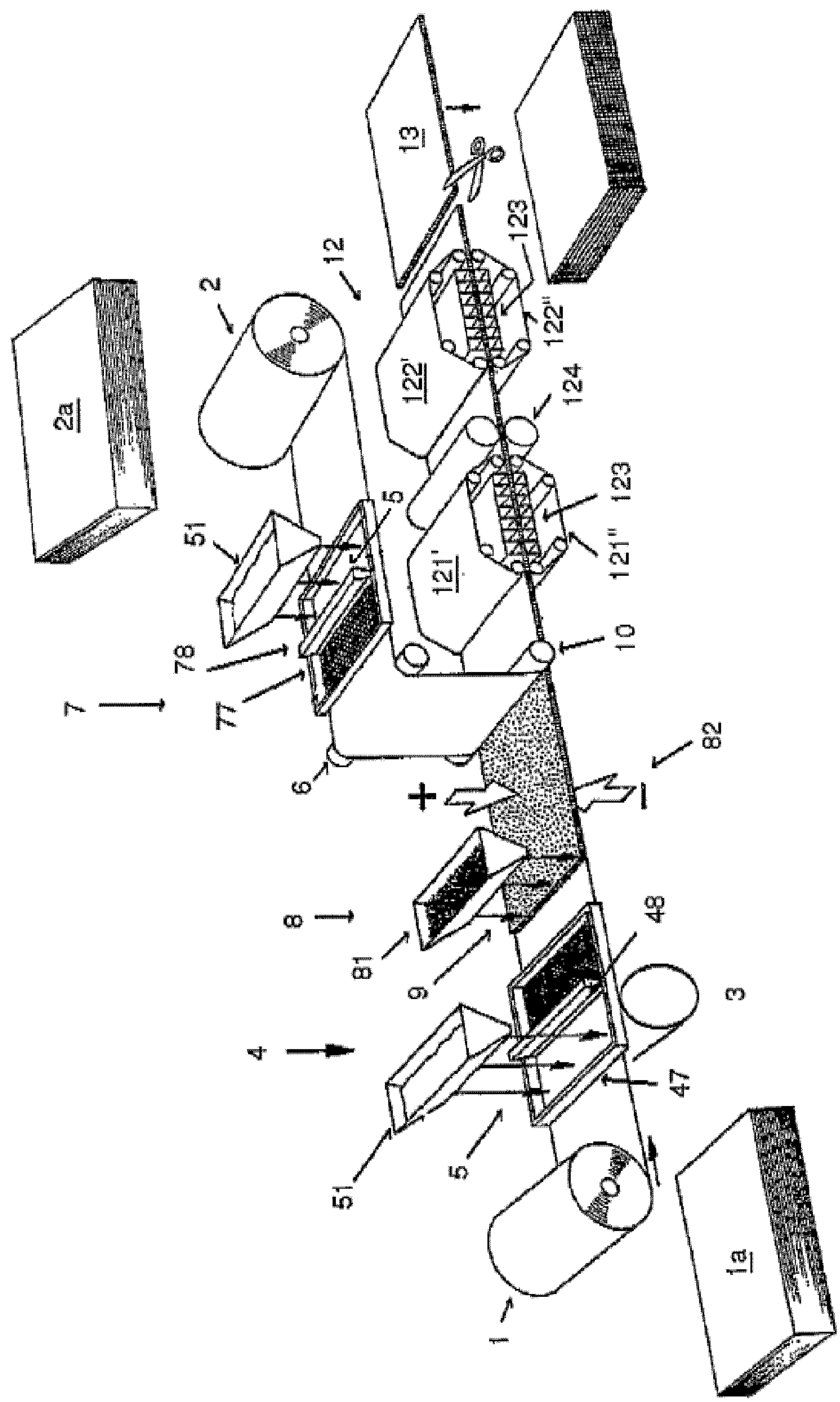
FIG. 1 is a schematic view in principle of a first embodiment of an arrangement for the manufacture of composite layer structures according to the invention.

FIG. 1 shows schematically a first such arrangement. A first and a second metal foil 1, 2 which each have a thickness of for example about 0.2 mm are introduced into the arrangement each in the form of a coil. Alternatively it is as well possible to introduce one metal foil with a substantially double breadth, dividing the same in the longitudinal direction (conveying direction) and then feeding these parts as the first and second metal foils according to the following description.

As another alternative, instead of the two wind-up metal foils 1, 2, sheets 1*a*, 2*a* which have been pre-cut to size can be conveyed through the arrangement (if necessary by means of or on a separate conveying belt). It is as well likely to combine a feeding of wind-up metal foils and single sheets of pre-cut metal foil. For example, the metal foil 2 shown in FIG. 1 could be replaced by pre-cut sheets 2*a* or the metal foil 1 could be replaced by pre-cut sheets 1*a*. The following explanations are valid for all these alternatives wherein in the following the term "metal foil" shall be used acting for all these alternatives. This is true as well if instead of one metal foil a foil or cover sheet from another material like the ones mentioned above exemplarily is used.

At first, the first metal foil 1 is fed by means of a first roll 3 past a first device 4 by which an adhesive 5 is applied on to the first metal foil. In a similar manner the second metal foil 2 is fed over a second roll 6 and passes a second device 7 by which an adhesive 5 is applied on to the second metal foil 2. If necessary, before applying the adhesive 5, the metal foils 1, 2 have to be pre-treated in a usual manner, for example by etching, or for activation of their surface they have to be subjected to a corona treatment and cleaned (not indicated).

Afterwards, the first metal foil 1 which has been coated by an adhesive 5 is conveyed through a flocking device 8 which is preferably encapsulated and conditioned (encapsulation and conditioning are not indicated) and by means of which the flock material which comprises single fibers 9 with a thickness of for example between about 5 and about 40 μm, especially about 22 μm, and a length of between about 0.1 and about 20 mm, especially between about 1 and about 5 mm, is applied onto the surface of the first metal foil 1 which is coated with adhesive 5 and especially in such a way that the fibers 9 are fixed in the adhesive coating as far as possible individually and with a desired orientation relative to the first metal foil 1 which in general is perpendicular to the same. This process is usually called flocking process.

Both metal foils 1, 2 are then joined together at a third roll 10 and conveyed into a dryer 12. According to the embodiment shown in FIG. 1 the dryer 12 comprises at its input a first upper conveying belt 121' and a second lower conveying belt 121" and at its output a third upper conveying belt 122' and a fourth lower conveying belt 122. The conveying belts 121', 121", 122', 122" are driven by means of a driving unit (not shown) wherein the first and third conveying belt 121', 122' are acting upon the composite layer structure from above and the second and fourth conveying belts 121", 122" are acting upon the composite layer structure in a conveying manner from below.

In the region of the action of the conveying belts 121', 1.21", 122', 122" and opposite to the first and second metal foil 1, 2 there is provided one heating or cooling unit 123 comprising a continuous pressing tool. Both metal foils 1, 2 are conveyed by means of the conveying belts 121', 121", 122', 122"through both of these pressing tools 123. By means of the pressing tools 123 the metal foils 1, 2 are pressed against each other and, in dependency of the type of adhesive, simultaneously heated so that the adhesive 5 is hardened and a safe connection between both metal foils 1, 2 and the fibers 9 is obtained. Afterwards, the metal foils 1, 2 and are cooled down to ambient temperature to avoid any warping.

Between both pairs of conveying belts 121', 121" and 122', 122" a sizing insulation 124 is provided by which the metal foils 1, 2 are joined together and pressed against each other with a desired distance by means of two rolls which can be driven as well. Such a sizing installation can additionally or alternatively be provided between the first roll 10 and the first pair of conveying belts 121', 121".

Finally, at the output of the dryer 12 a cutting device 13 is provided by which the pressed metal foils 1, 2 are cut up in a desired manner.

For conveying the first and second metal foil 1, 2 through the arrangement, another driving unit (not shown) can be provided by which the first and the second roll 3, 6 are drivingly rotated.

Figure 2:
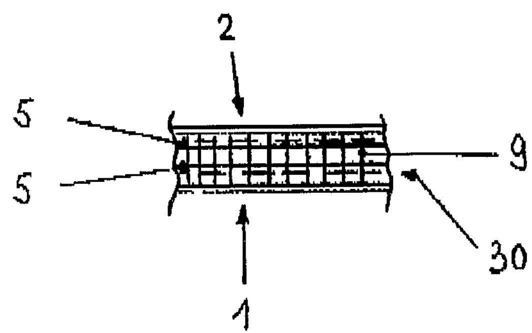
FIG. 2 is a cross section through a first composite layer structure manufactured by an arrangement according to FIG. 1.

FIG. 2 shows a cross section through a first composite or laminated or sandwich panel manufactured by the arrangement in which the first and the second metal foil 1, 2, as well as the core sheet 30 lying therebetween and comprising substantially perpendicularly oriented fibers 9. Both layers of adhesive 5 can be recognized.

In the following specification, single components of the arrangement according to FIG. 1 shall be explained in more details.

Both devices 4, 7 for applying the adhesive 5 onto the metal foils 1, 2 can be provided in different manner and can work according to different methods. The selection of the method is dependent especially on the kind and consistency of the adhesive 5, the surface of the metal foils 1, 2, and on the fact whether the whole surface or only specific regions have to be coated with the adhesive 5. The dependency on the kind of the adhesive and if applicable, the first and the second roll 3, 6, their surroundings and/or the metal foils 1, 2 can be heated in this region and in the region of the flocking device 8 (for example by means of an air stream, by infrared or ultraviolet radiation or by inductive means) to prevent a premature cooling down of the adhesive 5 and to improve its application and to keep it liquid such that the fibers 9 can reliably penetrate into it during the subsequent flocking process. If the adhesive 5 is too liquid it could be hardened partly by an appropriate heating so that the fibers can reliably be fixed in it.

According to a method which is similar to the well-known screen printing, the adhesive 5 which is stored in a tank 51 is distributed on a sieve 47, 77 which is positioned on the metal foils 1, 2 which are to be coated. Afterwards the adhesive 5 is pressed by means of a doctor blade (squeegee) 48, 78 through the sieve 47, 77 onto the metal foil 1, 2 as known from a screen printing process wherein the position, the material, the pressure and the shape of the doctor blade influences the amount of the applied adhesive 5. By this method, a particularly uniform distribution even in the case of a non level surface of the metal foils 1, 2 can be obtained.

For achieving a uniform thickness of the adhesive layer it might be advantageous to provide a heating device above the sieve 47, 77 and to heat the adhesive 5 and/or the sieve 47, 77 to decrease the viscosity of the adhesive 5 by a related temperature increase and to improve its flowability.

For improving the separation of the adhesive 5 from the sieve 47, 77 it can be provided with an appropriate anti-bond coating and/or a surface structure which makes easier the separation.

The adhesive 5 can be applied in several layers above each other. This may serve to obtain a certain thickness of the total layer especially if the second layer is applied onto the first layer with a reduced pressure. Alternatively, a second coating process may serve to complete and close the first layer especially if during the first screen printing process adhesive has not been applied (in a sufficient amount) onto all regions. These coating processes can be repeated several times with different pressures.

Furthermore, it can be advantageous to direct a stream of warm air over the applied adhesive layer. By this, small bubbles which are present in the adhesive layer can be removed and the surface of the adhesive layer becomes particularly plain.

Figure 3A:
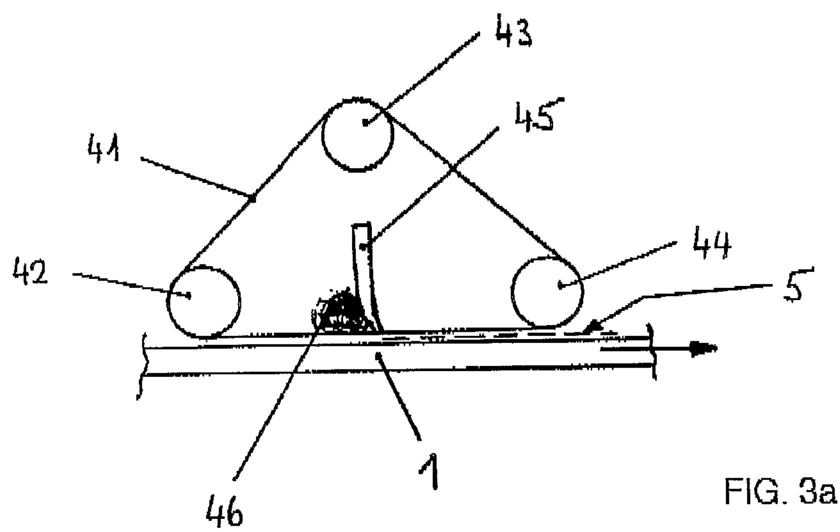
FIG. 3*a* is a cross section through an advantageous first device for applying adhesive onto a cover sheet, as a part of an arrangement according to the invention.
Figure 3B:
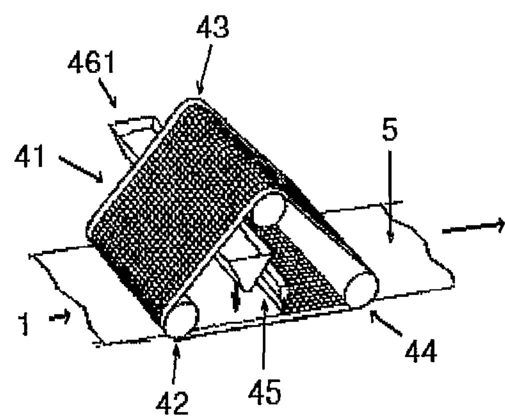
FIG. 3*b* is a three-dimensional view of the first device according to FIG. 3*a;*
Figure 3C:
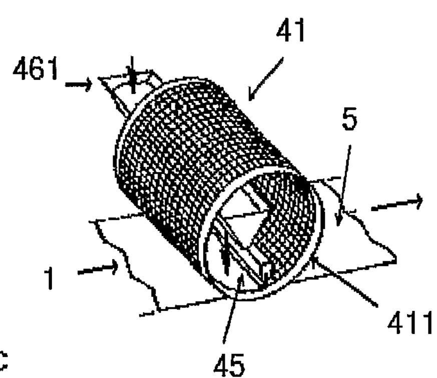
FIG. 3*c* is a three dimensional view of an advantageous second device for applying adhesive onto a cover sheet, as a part of an arrangement according to the invention.

Another alternative in which the principle of screen printing is used as well is shown schematically in FIGS. 3*a* to 3*c*. In these representations it is started exemplarily from the fact that the adhesive 5 is applied onto the first metal foil 1. However, with such an arrangement the second metal foil 2 or an additional or another cover sheet can be coated with adhesive 5 as well.

According to FIGS. 3*a* and 3*b* a flexible and semi-permeable tape, for example a fabric tape 41, is guided by means of three rolls 42, 43, 44 and pressed onto the metal foil 1 to be coated. Hence, the fabric tape 41 is usually pulled with the conveyed metal foil 1 so that a separate activation is usually not necessary. On the side of the fabric tape 41 opposite to the metal foil 1 a stationary doctor blade (squeegee) 45 is positioned which presses a supply 46 of an adhesive which has been fed from a funnel 461, through the fabric tape 41 onto the metal foil 1. Again, the application of the adhesive can be influenced substantially by the position, the material, the pressure and the shape of the doctor blade.

The adhesive 5 carried with by the fabric tape 41 is preferably removed in the region of the roll 44 by means of an appropriate stripping element (not shown). Preferably at least one of the rolls 41, 43, 44 is shiftingly supported so that the tension of the fabric tape 41 can be adjusted.

FIG. 3*c* shows an embodiment in which the fabric tape 41 is stretched over a drum 411 within which the funnel 461 for the adhesive and the doctor blade 45 are positioned. Alternatively, a sieve can be formed as a drum which is permeable for the adhesive 5 (rotational screen printing) and within which the doctor blade is positioned and into which the adhesive 5 is fed so that the adhesive is provided through the wall of the drum onto the metal foil 1, 2 if the drum is unrolling on the metal foil 1, 2. Additionally to the above mentioned measures the separation of adhesive can be improved by increasing the diameter of the drum.

By means of these arrangements and methods, it is as well possible to apply the adhesive 5 only to specific areas or in the form of a particular pattern onto the metal foil 1, 2 if a sieve and fabric tape 41, respectively, are permeable for the adhesive 5 only in specific areas. The generation of such patterns on a sieve and a fabric tape 41, respectively, is known from usual screen printing processes.

Such patterns can, for example, have a honeycomb structure which is composed of a number of polygons (triangle, pentagon, hexagon, octagon). Furthermore, patterns of adhesive can be provided in the form of spirals, serpentines, rectangles, circles, dots, circular curves, ellipses, stars, crosses, as well as other geometrical patterns and any combinations of those patterns.

The choice of such a pattern can be made not only for saving adhesive 5 and fiber material but also in dependency on the future application of the laminated panel. If for example the laminated panel is proposed to be welded or cut, the metal foils 1, 2 are not coated at the later weld points (or weld seam or cutting edge) to obtain a particularly clean weld seam and cutting edge, respectively, which is free from adhesive 5 and consequently free from fibers 9 as well. Furthermore, during the later welding no vapor of burning adhesive 5 is released.

Only a local coating with adhesive 5 is appropriate if specific locally differing (direction-dependent) mechanical, acoustical, thermal, absorption, oscillation or other physical properties of the composite structure workpiece (workpiece with gradient properties) is obtained.

In case of a large-surface coating of a metal foil 1, 2 with adhesive, internal stresses may arise because of differing thermal coefficients of expansion of both materials. These stresses can at least substantially be avoided if the adhesive is applied in the form of a non continuous layer which is formed for example from single islands of adhesive (dots pattern). Such an adhesive pattern can be applied by means of a method known from screen printing.

This simultaneously serves to solve another problem; upon using most of the presently known adhesives a temperature increase of the composite layer structure has the consequence of a considerable decrease in the delamination resistance. If, however, the adhesive is not applied in a continuous layer but in the form of a plurality of adhesive islands this delamination resistance remains considerably higher even at higher temperature.

Finally, it is possible to keep certain areas between the metal foils 1, 2 free of adhesive. These areas can have the form of cavities or channels through which a liquid or a gaseous medium is guided or into which before joining both metal foils 1, 2 objects are inserted or into which after joining the metal foils and object is pushed in from the rim of the structure.

As an alternative to the application by a screen printing, such a selective application of adhesive can be obtained as well by a spray system if it comprises a plurality of spray nozzles which can individually be controlled and which preferably can be heated to achieve or maintain a sufficient low viscosity of the adhesive. Such a spray system is preferably controlled by a computer so that in a relatively simple manner almost any patterns of adhesive can be generated on the metal foils 1, 2.

The use of a sheet die (slid die) which can possibly be heated can be advantageous as well for applying a first adhesive layer (pre-application) or the whole adhesive layer (pre- and final application).

Figure 3D:
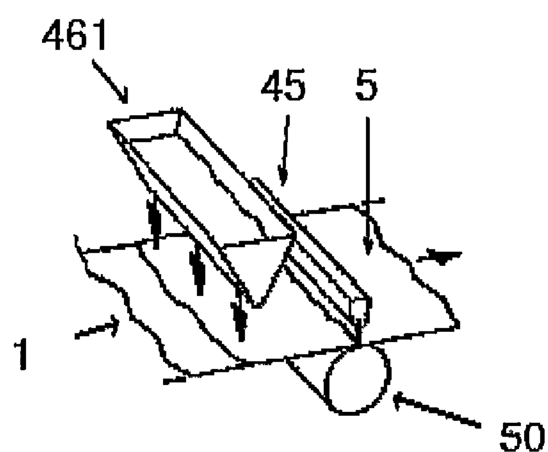
FIG. 3*d* is a three-dimensional view of an advantageous third device for applying adhesive onto a cover sheet, as a part of an arrangement according to the invention.

Another possibility according to FIG. 3*d* is to apply the adhesive 5 from the funnel 461 directly onto the metal foils 1, 2 by using a doctor blade (squeegee). For achieving an adhesive layer which is as uniform as possible, the related metal foil 1, 2 is usually fed past the doctor blade by means of a drum 50 or, in the case of a non-continuous method, the metal foil is fixed on a vacuum table. In a similar manner the adhesive 5 can as well be rolled on and then calibrated by means of a knife blade or similar devices, wherein in both cases a certain adhesive pattern can be obtained after application by means of a comb like doctor blade which is drawn over the metal foils 1, 2 which are coated with adhesive.

The kind of the adhesive 5 used is substantially determined by the kind of application, the later use of the composite layer structure and especially by the desired properties like for example the stiffness or flexibility, strength and so on, as well as the kind and distribution of the flock fibers. Substantially three different kinds of adhesive have to be considered: these are the so-called reactive adhesives which are adhesives which harden at normal or increased temperatures, furthermore, the two-component adhesives and the well-known thermoplastics.

If for example a particularly high stiffness of the material is desired, adhesives 5 which are similar to a foam and which expand can be used to enclose the fibers 9 to the greatest possible extent during the hardening (curing) of the adhesive 5 if the distance of the metal foils 1, 2 is held constant so that an especially firm and compact connection between the metal foils 1, 2 and the fibers 9 is obtained.

If however a good mechanical and acoustic energy absorption and ductility of the composite layer structure is desired, adhesives 5 can be used which keep a certain flexibility in their hardened (cured) condition. In these cases certain hot melting adhesives or epoxy adhesives can be used.

If the composite layer structure is to be machined by forming operations for example deep-drawing, it is preferred to use adhesives with a strength which decreases in hardened condition by increasing temperatures. In this case the sandwich structure as a whole becomes more flexible and elastic and can be formed to a greater extent without any damage wherein the necessary forces are smaller as well. Possibly even a manual forming can be conducted if the adhesive is appropriately chosen and sufficiently heated.

Furthermore the adhesive 5 can be applied onto the metal foils 1,2 in the form of an adhesive foil or in the form of several sections of an adhesive foil wherein a certain pattern having any shape can for example be punched into the adhesive foil. The adherence of the metal foils 1, 2 can for example be obtained by means of an electrostatic charging. The thickness of the foil either corresponds with the thickness of the desired adhesive coating or an adhesive foil with a greater thickness is accordingly stretched and rolled out. By this air inclusions can be avoided or removed simultaneously. By heating the adhesive layer and/or the metal foils 1, 2 during the following flocking process the fibers can penetrate to a sufficient extent into the adhesive coating and can be fixed therein.

In certain cases it may be advisable not to coat one or both metal foils 1, 2, partly or as a whole, by means of the device but instead feed at 1 east one metal foil which has been already coated with an adhesive layer. In this case the adhesive layer is preferably covered with a non adhesive protection foil so that the related metal foil can be rolled up. Before or at the beginning of supplying into the arrangement, the protection foil is manually or automatically (not shown) drawn off.

Finally, it is as well possible to coat the first metal foil 1 according to the description above with a viscous adhesive 5, to apply an adhesive foil onto the fibers 9 after the flocking process and then, possibly after heating, to press the second metal foil 2 therewith.

The above mentioned measures can be combined with each other for optimizing the coating of the adhesive.

After having coated the metal foils 1, 2 with an adhesive 5, the flocking process is conducted by means of the flocking device 8. The flocking device 8 as well can work according to different methods which are selected in dependence on the kind of the materials from which the fibers 9 are made and the thickness, the length and the desired density and distribution, respectively, of the fibers 9 on the first metal foil 1.

Another criterion for the selection of the methods is the desired properties of the composite layer structure. If a flexibility and ductility as high as possible is desired the fibers 9 should be fixed as far as possible perpendicularly to the surface of the metal foils 1, 2. If, however, a stiffness as high as possible is desired the fibers 9 should be positioned to a greater extent inordinate and especially angular and diagonal, respectively, and crossing each other.

By means of the heating device (stream of warm air, infrared or ultraviolet radiation, inductive heating, etc.) the viscosity of the adhesives 5 can be decreased during the flocking process to ensure that the fibers 9 can penetrate to a sufficient extent into the adhesive layer.

The starting material for the flocking process is usually a bundle of metallic wires or a bundle of fibers made from another one of the above mentioned materials which are at first cut to a desired length.

The embodiment of the flocking device 8 shown in FIG. 1 comprises one (or more) vessels 81 into which the cut fibers 9 are and which is provided with a bottom which is permeable for the fibers 9 through which the fibers 9 can be applied onto the first metal foil 1. The vessels 81 on the one hand and the metal foil I on the other hand are subjected to different electric and/or magnetic potentials so that between both an electric and/or magnetic field 82 is generated. For this purpose a related voltage source and devices for generating the electric and/or magnetic field (not shown) are provided. The field strengths and the permeability of the bottom of the vessel 81 are matched to each other such that the fibers 9 penetrate through the bottom, are accelerated by the electric and/or magnetic field in the direction of the metal foil 1, and then penetrate with one and into the adhesive layer so that they are fixed for example substantially perpendicularly to the metal foil 1.

In order to obtain a desired density of the fibers in the adhesive layer 5, especially the strength of the fields 82, the distance between the vessel 81 and the metal foil 1 and the velocity with which the metal foil 1 is moved can be adjusted. Furthermore at least one vibration device (not shown) can be provided with which the vessel 81 is subjected to a vibrating motion in a horizontal and/or vertical direction which preferably can be adjusted, for increasing and modulating the amount of fibers 9 penetrating through the bottom and for loosen up the fibers 9.

Another parameter with which the density and distribution and homogeneity of the fibers 9 can be influenced is the kind of the bottom of the vessel 81. This especially concerns the number, the dimension, the shape and the density of the openings in the related bottom, wherein in order to obtain different delivery amounts of fibers 9 a related screen device can be provided with which at least some of the openings can be closed partly or totally.

Especially in a case in which the bottom of the vessel 81 is provided in the form of a sieve the delivery properties can be influenced as well by shaping, imprinting and/or structuring the same. Such a sieve is preferably used in combination with a vibration device ("shaking screen") in order to loosen up, to separate from each other and to unmatch the fibers loaded into the vessel 81 and to prevent that the sieve is clogged more or less at single locations by fibers. In this connection it can be advantageous to vibrate the sieve with different frequencies and/or different amplitudes wherein alternatively or additionally acoustic pressure waves and/or compressed air can be used for example to separate fiber clusters or to optimally sieve fibers 9 with different lengths.

In order to inhibit or avoid the formation of clusters of fibers 9 it is possible to provide the fibers with an appropriate coating. Such a coating can be one component of a two component adhesive wherein the second component is applied according to the above description by means of the first and second device 4, 7 onto the metal foil 1, 2, respectively, to be coated.

Furthermore an electrode (not shown) can be positioned between the vessel 81 and the metal foil 1 for example in the form of a ring which is subjected relative to the metal foil 1 and the vessel 81, respectively, to such a voltage potential that the fibers 9 are additionally accelerated or decelerated according to the principle of the well-known triode (three-electrode) valve.

The amount of the delivered fibers and the direction under which the fiber stream is directed onto the metal foil 1 can be controlled as well by using the well-known principle of the Braun tube. In this case a device formed like a modulating Wehnelt electrode, and several cylindrical electrodes can be used for focusing and accelerating a related fibers stream, which moreover is directed by means of electric and/or magnetic fields and by a corresponding control of the devices for generating these fields, with different directions onto the metal foil 1.

By a variation of all these parameters during operation of the flocking device 8 sections with varying densities of fibers and sections with an inhomogeneous distribution of the fibers or sections without fibers can be obtained on the adhesive layer.

Examinations of the delamination properties have shown that after hardening (curing) of the adhesive 5 the fibers 9 are stronger fixed within the flock adhesive layer of the first cover sheet (which in the described method is the first metal foil 1) than in the adhesive layer of the second cover sheet (second metal foil 2) which has been applied onto the first cover sheet. In order to achieve an as uniform as possible delamination resistance and a uniform distribution of other physical properties on both cover sheets, both these cover sheets can be flocked with a positive/negative pattern in such a way that after joining the sheets the flocked areas within the core sheet are lying side-by-side and mesh with each other like teeth.

In this case it is particularly advantageous to use a method according to which as explained in the introductory part, a metal foil having substantially twice the breadth is supplied which is divided into two halves in the longitudinal direction after coating of the adhesive and flocking the fibers and possibly pit-curing of the adhesive wherein afterwards both halves are folded together, pressed and subjected to a final curing.

In order to achieve a positive/negative pattern, templates (not shown) can be used for flocking, with which on one of the cover sheets a pattern in the form of flocked areas is generated which represents the negative pattern (non flocked areas) of the pattern on the other cover sheet so that these mutually complete each other upon joining the cover sheets together.

The templates are preferably provided in the form of a belt made for example from a fabric or foil material and are guided like a conveyor belt by means of three guiding rolls with the same velocity as the cover sheet to be flocked. This has the advantage that excess fibers 9 which have not reached the related cover sheet through the openings within the template can be removed in the area of one of the guiding rolls by means of stripping or sucking devices.

Alternatively the fibers 9 can be applied through tubes having a desired cross section and being positioned according to the related pattern wherein the tubes (not shown) each end shot above the adhesive layer of the related metal foil 1, 2, and possibly each end is provided with a sieve so that they fulfill substantially the function of the vessel 81. In this case as well the fibers 9 can be accelerated or influenced according to the above explanations by means of electric and/or magnetic fields.

Another possibility for obtaining a certain distribution of the density of the fibers 9 is to apply a foaming adhesive 5 in the form of dots on different places of the first metal foil 1, than placing a fiber bundle onto each dot and pre-curing the adhesive 5. As a consequence of the foaming adhesive the single fibers 9 are separated from each other and/or fan out in their direction similar to a bunch of flowers, so that local regions with a relatively uniform density of fibers are obtained wherein the number and the distance of these regions is determined in dependence on the proposed use of the composite layer structure. The joining of the metal foils 1, 2 and the final curing of the adhesive is then conducted according to the explanations below.

According to another embodiment of the flocking device 8 instead of the vessel 81 a cutting device can be provided with which the supplied fiber bundles are cut over the metal foil 1 by means of a laser beam or a mechanical device and then directly guided to the metal foil 1 for example under the influence of a constant or variable electric and/or magnetic field according to the above explanations.

Another possibility is to fix the fibers 9 in a substantially non-cut condition first on the adhesive layer and a then cutting them for example by means of a knife or a laser beam in a desired height over the metal foil 1.

In order to achieve in a considerable dimension a non-perpendicular and inordinate orientation of the fibers 9 relative the metal surface, during or immediately after the application of the fibers 9 a continuous or swirled stream of air can be directed onto the fibers 9 and or the metal foil 1. For this purpose preferably in the region of the flocking device 8 a related fan device (not shown) is provided. If the fibers 9 are to be oriented with a common preferred direction angular to the surface of the metal foil 1, a blade can be used which is grazed after application of the fibers 9 over the flocked surface.

In case of a suitable fiber material the fibers 9 can be oriented as well by means of an appropriate electric and/or magnetic field. The parameters with which the orientation can be influenced are substantially the strength and the direction of the field, the distance of the field generating devices from the flocked surface, and the motion velocity of the flocked surface. By means of a plurality of relatively small field generating devices which are individually controlled, an orientation of the fibers 9 can be obtained which can be specifically controlled in the kind of a pattern extending over the whole flocked surface.

Another possibility is to guide the flocked surface under and past a metal rod wherein the metal rod and the fibers 9 are connected to such potentials that the fibers 9 are attracted or repelled from the metal rod so that they are inclined in this way.

Finally, preferably and especially in such a case in which only certain areas of the metal surface are coated with adhesive 5, a third device (not shown) is provided with which fibers 9 which are lying between these areas are removed before the metal foils 1, 2 are joined together. This third device can be a blow off or suck off device, or the fibers are removed for example by means of an electric and/or magnetic field.

Especially in case of a relatively thin liquid adhesive 5 it can be advantageous to harden the same immediately before or after application of the fibers 9 to thereby obtain a pre-fixing of the fibers 9 before both metal foils 1, 2 are joined together. This pre-harden can be achieved by means of a stream of hot air, an inductive heating or by a radiation with infrared or ultraviolet light immediately before the first metal foil 1 enters the flocking device 8. If there is a risk that the metal foil 1 warps, this can be prevented by either coating it only partly with adhesive 5 and/or using a metal foil 1 with a higher strength.

If on the other hand an adhesive 5 is selected with a very high viscosity it might be useful to melt it somewhat by heating before flocking so that the fibers 9 can better penetrate into the adhesive layer. This is valid as well for the adhesive 5 applied onto the second metal foil 2 before joining it together with the first metal foil 1. Again, such a heating can be obtained by means of a stream of hot air, a radiation of infrared or ultraviolet light, by an inductive heating if the adhesive 5 which is possibly mixed with metal particles, and/or of the metal foils 1, 2 and/or the fibers 9, or as mentioned above by means of rolls 3, 6 which are heated.

An alternative for the flocking of the metal foil 1 with fibers 9 is to apply instead of the adhesive 5 a mixture of adhesive 5 and fibers 9 which has been prepared by a mixer onto the first and/or the second metal foil 1, 2. By this, on the one hand a particularly arbitrary and inordinate orientation of the fibers relative to the surface of the metal foils 1, 2 can be obtained. On the other hand, however, it is possible as well to align the fibers 9 after the mixture has been applied as explained above by feeding an electric and/or magnetic field. In both cases it might be sufficient to only coat one of both metal foils 1, 2.

In this case it might be advantageous to feed at least one of the metal foils to the arrangement which is pre-coated with such a mixture which is covered by a protection foil as explained above with regard to the metal foil which is coated with an adhesive and covered with a protection foil.

Summarizing, in order to obtain different or varying (i.e. direction-dependent) physical and/or electric properties along a width and/or a length of the composite layer structure, the fibers 9 can be applied with different densities, thickness, length, material and/or different orientation relative to the cover sheet onto at least one of the cover sheets wherein the above mentioned: measures, if desired, can as well be combined with each other. In this connection, the mutual displacement-capability of the cover sheets can have a substantial influence on these direction-dependent properties.

The arrangement of the dryer 12 by means of which both metal foils 1, 2 are firmly connected with each other by pressing against each other and hardening the adhesive 5 and especially the distance of the metal foils 1, 2, the value of the temperature and of the pressure, as well as the duration of their influence onto the metal foils 1, 2 is substantially dependent on the kind of the used adhesive 5 and the thickness and quality of the metal foils 1, 2.

With regard to the above, one must distinguish between the hot melting adhesives which are liquid in a warm or hot condition and which hardened by cooling down, and the other adhesives, for example epoxy-adhesives which harden upon the influence of heat. In dependence on this the pressing tool 123 possibly comprises an additional heating device.

In a case in which the composite layer structure is to be machined by forming processes (for example a deep-drawing process) in which the structure is usually heated, such an adhesive is advantageous whose strength decreases with increasing temperature so that the core sheet can adapt flowingly according to the forming of the metal foils 1,2.

In order to avoid warping of the metal foils 1, 2 during hardening (curing), it is essential that both metal foils 1, 2 are heated within the pressing tool 123 and afterwards are as homogeneous and uniform as possible, cooled down, and as simultaneously as possible.

This can be achieved if both metal foils 1, 2, after reaching the pressing tool 123, are first heated up to a starting temperature before heating is continued until reaching the curing temperature of the adhesive, together with simultaneously pressing the metal foils 1, 2 together. Depending on the curing temperature of the adhesive and the thickness of the metal foils 1, 2 the starting temperature can for example be about 100° C.

Another possibility is to not directly contact the metal foils 1, 2 with the pressing tool 123 but to insert between the pressing tool 123 and the metal foils 1, 2 one plane element (for example a sheet steel, a metal plate, a foil, a fabric material, etc.) which has a higher thermal capacity and/or a lower thermal conductivity than the metal foils 1, 2. This prevents the metal foils 1, 2 from heating abruptly at the first contact areas with the pressing tool 123, but a temperature gradient is generated between the pressing tool and the metal foils 1, 2 along which the metal foils 1, 2 are continuously and slowly heated. This heating process can be optimized by an appropriate selection of the materials and thickness of the plane elements.

After compressing and curing the adhesive 5, the plane elements can serve to ensure a uniform cooling down of the metal foils 1, 2 and to prevent a warping. If necessary, the cooling down can be controlled by means of a cooling device which is guided along or over the free sides of the plane elements. For this purpose the plane elements can comprise appropriate channels for feeding a coolant.

The risk of forming dents can considerably be reduced if the temperature within the pressing tool 123 is decreased and the duration of the compressing is increased correspondingly, especially in case of particularly thin metal foils 1, 2 and/or those with a relatively poor quality.

Inclusions of air can generate dents as well if the air cannot escape fast enough when the pressing tool 123 is closed. This can be prevented by inserting between the metal foils 1, 2 on the one hand and the pressing tool 123 on the other hand, a heat resistance tissue through which the air can escape laterally from the pressing tool 123.

Both metal foils 1, 2 can be heated particularly uniform and fast by means of a well-known inductive heating device (not shown). This is true especially if the fibers 9 are metallic and the adhesive 5 as well contains metallic particles because in this case the heat is also generated between the metal foils 1, 2 and enables a particularly fast and uniform heating of the adhesive 5 and prevents as well a warping of the metal foils 1, 2.

Furthermore, the curing of the adhesive between both metal foils 1, 2 can be conducted in two or more steps. For example, after joining together the metal foils 1, 2 within the dryer 12 according to FIG. 1, a pre-curing can be conducted in a first step to such an extent that the metal foils 1, 2 do not expand any more during the later final curing. The metal foils 1, 2 can then first be cut by the cutting device 13 in a desired manner and then the single parts can be final-cured in a second step (not shown) with the same or at a higher temperature with which the final strength is achieved, wherein for this purpose the parts can be introduced into an appropriate oven having any orientation or position because of the pre-curing.

When using a well-known pressing tool 123 the distance to which the metal foils 1, 2 are compressed together within the dryer 12 can usually be adjusted. Modulating the amount of adhesive 5 applied onto the metal foils 1, 2 and the thickness of the adhesive coating, two alternatives can be distinguished with respect to the compactness of the generated core sheet which lead to different properties of the material.

Regarding the first alternative, the distance is so great and/or the amount of the adhesive 5 and the thickness of the adhesive layer is so small that the fibers 9 present on the first metal foil 1 penetrate with their free ends only so far into the adhesives layer of the second metal foil 2 that after curing the adhesive a safe connection between both metal foils 1, 2 is ensured.

Regarding the second alternative, the metal foils 1, 2 are compressed together to such a small distance and/or the amount of adhesive 5 and the thickness of the adhesive layer, respectively, is so far increased that between the metal foils 1, 2 a substantially homogeneous, porous and compact core sheet is generated in which the fibers are completely surrounded by foam and enclosed.

In this case, however, it has to he ensured that air bubbles which are possibly present within the adhesive layer can substantially escape, or that the adhesive layer is substantially free from such bubbles before joining the metal foils 1, 2 together. This can for example be achieved if between applying the adhesive 5 and joining the metal foils 1, 2 together, a certain time duration expires, or if a stream of (hot) air is guided over the adhesive layer so that the bubbles underneath its surface burst.

Figure 4:
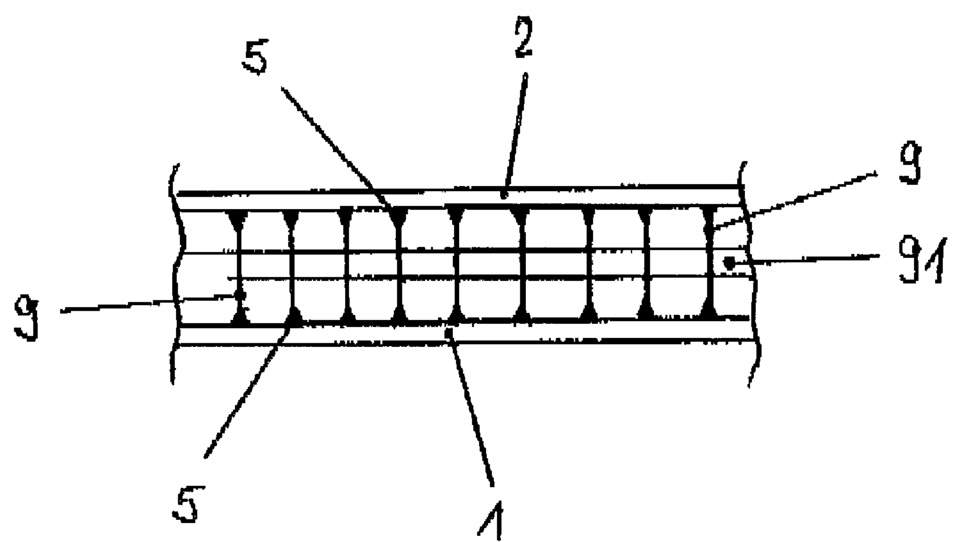
FIG. 4 is a cross section through a second composite layer structure manufactured by a method according to a preferred embodiment of the invention.

For specific applications and for reasons of recycling of materials it can be desired not to use adhesive 5 at least as far as possible. In this case the fibers 9 at first can be inserted according to FIG. 4 into a carrier 91 in the form of a sheet of paper or a similar material so that their free ends bear out on both sides of the carrier 91. If necessary, the fibers 9 are then brought to a desired length by shortening the free ends (for example by means of a laser beam) before an electrically conductive adhesive 5 is applied onto the fibers tips and the carrier 91 is then laid upon the first metal foil 1.

After this the fibers 9 are adhered to the first metal foil 1 by an inductive heating of the adhesive 5. The carrier 91 ensures that the fibers 9 keep their substantially perpendicularly orientation relative to the metal foil 1 or, if they have been inserted into the carrier 91 with a certain angle, keep this angel during the adhering process. After the adhesive is cooled down the carrier 91 can be removed and the second metal foil 2 can be applied for example by means of another such adhering process.

Furthermore, it is possible to fix the metallic fibers 9 by an inductive stitch welding directly onto the metal foil 1. For this purpose, a substrate is applied onto the first metal foil 1 into which the fibers 9 can easily penetrate during the flocking process so that they are fastened. At next the first metal foil 1 is inductively heated. By an appropriate selection of the conductivity of the substrate a specific heating of the transition between the first metal foil 1 and the fibers 9 is achieved so that both are welded to each other. In the same manner or in a manner as explained above, the second metal foil 2 is applied.

The above disclosed methods for manufacture are applicable as well, with only a few exceptions which are obvious for persons skilled in the art, if instead of one or both metal foils 1, 2 and metal plates, respectively, non-metallic material (for example synthetic materials like kevlar or similar) is used for a cover sheet or if the fibers 9 are manufactured from a non-metallic material. It is especially possible to use sheets of paper or paperboard instead of one or both metal foils 1, 2 whereby a considerable weight reduction can be achieved.

In this regard a plurality of different combinations of materials for the cover sheets and at least one core sheet can be realized. For example a combination of metal and non-metal can be selected for both cover sheets with a core sheet comprising metal fibers there between. In case of a multiple composite layer structure it can be advantageous to manufacture the outer cover sheets from a non-metallic material like especially a synthetic material to achieve a corrosion resisting structure, whereas the inner cover sheets are made from a metallic material to achieve certain physical properties of the structure wherein the core sheets may contain as well metallic and/or non metallic fibers.

If using a mixture of metallic and non-metallic fibers 9, as well with differing mixture ratios along a flocked surface, certain parameters like the electric conductivity between the cover sheets or the mechanical damping properties can specifically be influenced and adjusted. This is also true in case of use of a mixture of fibers 9 with differing length and/or thickness and/or differing materials and possibly differing mixture ratios along the flocked surface.

By using a certain fraction of shorter or formed fibers which are fixed in an adhesive layer with only one end, the other end of which is standing free, a considerable improvement of the acoustic- and oscillation-dampening properties of the composite structure can be obtained. These properties further improve with an increasing fraction of such shorter or formed fibers within the flock material. A possible small loss of strength which could possibly occur could substantially be compensated, if necessary, for example by an increase of the whole fiber density.

Instead of the fibers 9 (or additionally to those) spherical bodies, parallelepiped bodies or other similarly formed bodies of metallic and/or non-metallic materials and/or with differing dimensions can be used.

The method according to the invention is as well applicable for the manufacture of multiple composite layer structures in which several layers of the above disclosed kind are joined together by means of fiber material or in which an additional layer of a same or another material is applied onto the composite layer structure to achieve certain mechanical or other properties. It is possible to guide a composite structure, comprising three sheets which has been manufactured as disclosed above, together with a cover sheet or another composite structure again through the arrangement in order to join together both by generating a core sheet according to the explanations above.

Furthermore, by means of the method according to the invention, manufacturing is not limited to plane composite structures. For example a pipe with a double wall can be manufactured by first coating an inner pipe with an adhesive, then applying flock fibers onto the adhesive and finally laying a sheet steel there around or winding like a helix a strip of metal or another material as an otter pipe there around and curing the adhesive.

The strength of the composite layer structures manufactured as disclosed above can be increased further if necessary by a final malleablizing.

The mechanical properties of the composite layer structures according to the invention can be evaluated by means of the numerical method of the finite elements quite well. By this especially the influences of the density, the diameter, the orientation, the fixing, as well as of the materials of the used fibers, the influences of the materials and the thickness of the adhesive layers, as well as of the materials and the thickness of the cover sheets can be evaluated. Furthermore the influences of different patterns of the adhesive and of the fibers at the cover sheets (shape, covering ration, pattern) on the mechanical and thermodynamic properties can be evaluated.

The thermal warping of the composite layer structure, especially in combination with different materials, can be investigated by means of the numerical method of the finite elements as well. For this purpose the inherent tension condition which arises due to the different heat expansion within the adhesive and within the cover sheets is calculated.

Finally, the method according to the invention is suitable as well for the manufacture of workpieces from pre-formed cover sheets which are coated with adhesive, flocked and joined together in the disclosed manner if the related devices for holding and guiding the cover sheets are provided in an appropriate way.

What is claimed is:

1. A method for manufacturing a composite layer structure from at least one first and at least one second cover sheet (1, 2) and between which a core sheet (30) is provided which comprises a composition of fibers (9) and adhesive (5), wherein the cover sheets and the fibers are made of steel, aluminium or any other metallic materials, or alloys, or ceramics, or any substances or mixtures comprising these materials, said method comprising the following steps:

applying the adhesive (5) onto the at least one first and the at least one second cover sheet (1, 2) such that locally varying physical properties of the composite layer structure are achieved by locally applying the adhesive (5) only onto predetermined specific areas of the first and second cover sheets (1, 2) in the form of a pattern comprising cavities or channels which remain free of adhesive (5) and fibers (9), or in the form of a non-continuous layer comprising islands of adhesive (5), such that inherent stresses due to different thermal expansion coefficients of the cover sheets (1, 2) are at least substantially avoided; then applying the fibers (9) onto areas coated with the adhesive (5) of at least one of the cover sheets (1, 2); and joining the cover sheets (1, 2) together.

2. The method of claim 1, wherein locally varying physical properties of the composite layer structure are achieved by applying fibers (9) of varying kind depending on at least one of density, thickness, length, material and orientation relative to the cover sheets of the fibers.

3. A method for manufacturing a composite layer structure from at least one first and at least one second cover sheet (1, 2) between which a core sheet (30) is provided which comprises fibers (9), wherein the cover sheets and the fibers are made of steel, aluminium or any other metallic materials, or mixtures comprising these materials, said method comprising: fixing the fibers (9) onto at least one of the first and the second cover sheet (1, 2) by an inductive stitch welding.

4. The method as recited in claim 3, further comprising:

applying a substrate onto the first cover sheet (1) into which the fibers (9) can penetrate during a flocking process for being fastened thereto;

applying the fibers (9) onto the substrate such that they are fastened thereto;

inductively heating the first cover sheet (1) and the transition between the first cover sheet (1) and the fibers (9) so that both are welded to each other;

applying the second cover sheet (2) onto the fibers (9); and inductively heating the second cover sheet (2) and the transition between the second cover sheet (2) and the fibers (9) so that both are welded to each other.

5. A method for manufacturing a composite layer structure from at least one first and at least one second cover sheet (1, 2) between which a core sheet (30) is provided which comprises a composition of fibers (9) and adhesive (5), wherein the cover sheets and the fibers are made of steel, aluminium or any other metallic materials, or alloys, or ceramics, or any substances or mixtures comprising these materials, said method comprising the following steps:

applying a mixture of fibers (9) and adhesive (5) onto at least one of the at least one first and the at least one second cover sheets (1, 2) whereby locally varying physical properties of the composite layer structure are achieved by locally applying the mixture only onto predetermined areas of the at least one first and the at least one second cover sheet (1, 2) in the form of a pattern comprising cavities or channels which remain free of the mixture of fibers (9) and adhesive (5), or in the form of a non-continuous layer comprising islands of the mixture of fibers (9) and adhesive (5), such that inherent stresses due to different thermal expansion coefficients of the cover sheets (1, 2) are at least substantially avoided; and joining the at least one first and the at least one second cover sheets (1, 2) together.

6. The method as recited in claim 1, wherein the step of applying the adhesive is executed by screen printing.

7. The method as recited in claim 5, wherein the step of applying the mixture of fibers (9) and adhesive (5) is executed by spraying.

8. The method as recited in claim 5, wherein the mixture of fibers (9) and adhesive foams and is applied substantially in the form of dots.

9. The method as recited in claim 1, wherein before applying the fibers (9) the viscosity of the adhesive (5) is increased by heating to a point of suitability for the penetration of the fibers (9).

10. The method as recited in claim 1, further comprising applying a mixture of metallic and non-metallic fibers (9) so that a desired electrical conductivity between the cover sheets (1, 2) is achieved.

11. The method as recited in claim 1, further comprising applying the fibers (9) in the form of a positive/negative pattern onto the cover sheets (1, 2).

12. The method as recited in claim 1, wherein during or immediately after applying the fibers (9) a steady or swirled stream of air is directed onto the fibers (9) in order to obtain a non-perpendicular and inordinate orientation of the fibers (9).

13. The method as recited in claim 1, wherein curing the adhesive (5) further comprises a pre-curing step and a final curing step.

14. The method as recited in claim 1, further comprising:

depositing the fibers (9) on a carrier (91) and putting the carrier onto at least one of the first and the second cover sheet (1, 2) and thereby adhering the fibers (9) to the respective cover sheet (1, 2).

15. The method as recited in claim 14, further comprising removing the carrier (91) after adhering the fibers to the respective cover sheets (1, 2).

16. The method as recited in claim 1, wherein the channels are suitable for guiding liquid or gaseous media.

17. The method as recited in claim 1, wherein the non-continuous layer of adhesive is applied in a pattern comprising at least one of the following shapes: polygons, spirals, serpentines, rectangles, circles, dots, ellipses, stars, and crosses.

18. The method as recited in claim 1, wherein the adhesive is selected from the group consisting of: reactive adhesives, two-component adhesives, thermoplastics, and adhesive foils.

19. The method as recited in claim 1, wherein the fibers (9) are aligned by applying one of an electric and magnetic field thereto.

20. The method as recited in claim 5, wherein the step of applying the mixture of fibers (9) and adhesive (5) is executed by screen printing.

21. The method as recited in claim 1, wherein the step of applying the adhesive (5) is executed by spraying.

22. The method as recited in claim 1, wherein the adhesive (5) foams and is applied substantially in the form of dots.

23. The method as recited in claim 5, wherein the mixture of fibers (9) and adhesive (5) comprises a mixture of metallic and non-metallic fibers (9) so that a desired electrical conductivity between the cover sheets (1, 2) is achieved.

24. The method as recited in claim 5, further comprising applying the mixture of fibers (9) and adhesive (5) in the form of a positive/negative pattern onto the cover sheets (1, 2).

25. The method as recited in claim 5, wherein curing the mixture of fibers (9) and adhesive (5) further comprises a pre-curing step and a final curing step.

26. The method as recited in claim 5, wherein the channels are suitable for guiding liquid or gaseous media.

27. The method as recited in claim 5, wherein the non-continuous layer of the mixture of fibers (9) and adhesive (5) is applied in a pattern comprising at least one of the following shapes: polygons, spirals, serpentines, rectangles, circles, dots, ellipses, stars, and crosses.

28. The method as recited in claim 5, wherein the adhesive is selected from the group consisting of: reactive adhesives, two-component adhesives, thermoplastics, and adhesive foils.

29. The method as recited in claim 5, wherein the fibers (9) are aligned by applying one of an electric and magnetic field thereto.

* * * * *